(12) United States Patent
Kobayashi

(10) Patent No.: US 11,351,947 B2
(45) Date of Patent: Jun. 7, 2022

(54) PASSENGER PROTECTION APPARATUS

(71) Applicant: Autoliv Development AB, Vargarda (SE)

(72) Inventor: Yuto Kobayashi, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 16/957,133

(22) PCT Filed: Jan. 2, 2019

(86) PCT No.: PCT/JP2019/000002
§ 371 (c)(1),
(2) Date: Jun. 23, 2020

(87) PCT Pub. No.: WO2019/138954
PCT Pub. Date: Jul. 18, 2019

(65) Prior Publication Data
US 2020/0346611 A1 Nov. 5, 2020

(30) Foreign Application Priority Data

Jan. 11, 2018 (JP) .............................. JP2018-003010

(51) Int. Cl.
*B60R 21/231* (2011.01)
*B60R 21/207* (2006.01)
(Continued)

(52) U.S. Cl.
CPC .... *B60R 21/23138* (2013.01); *B60N 2/42745* (2013.01); *B60R 21/207* (2013.01);
(Continued)

(58) Field of Classification Search
CPC ............ B60R 21/23138; B60R 21/207; B60R 21/217; B60R 21/233; B60R 21/2346;
(Continued)

(56) References Cited

U.S. PATENT DOCUMENTS 9,862,345 B2 * 1/2018 Ohno .................... B60R 21/276
2014/0035264 A1 2/2014 Fukushima et al.
(Continued)

FOREIGN PATENT DOCUMENTS

JP 2009-023494 A 2/2009
JP 2014-31096 A 2/2014
(Continued)

OTHER PUBLICATIONS

International Search Report of the International Searching Authority for PCT/JP2019/000002 dated Mar. 12, 2019.
(Continued)

*Primary Examiner* — Karen Beck
(74) *Attorney, Agent, or Firm* — Harness, Dickey & Pierce, P.L.C.; Stephen T. Olson

(57) ABSTRACT

[Problem] To provide a side airbag apparatus capable of quickly and properly restraining a passenger in the initial stage of deploying an airbag, along with a passenger protection apparatus including this side airbag apparatus.
[Resolution means] The airbag employed in the present invention includes: a first chamber (C1) which houses the inflator and is deployed outside in the vehicle width direction of the frame side wall part; a second chamber (C2) which is deployed inside in the vehicle width direction of the frame side wall part; and a gas guide (100) arranged so as to surround the inflator inside the first chamber. In addition, the first chamber (C1) is deployed such that at least a portion thereof, as seen from the vehicle side, overlaps the frame side wall part. A first inner vent is formed at the boundary part between the gas guide and the first chamber, with gas introduced from the gas guide to the first chamber via this first inner vent. Moreover, a second inner vent is formed at the boundary part between the gas guide and the second
(Continued)

chamber, with gas introduced from the gas guide to the second chamber via this second inner vent.

13 Claims, 13 Drawing Sheets

(51) Int. Cl.
| | |
|---|---|
| *B60R 21/233* | (2006.01) |
| *B60R 21/2346* | (2011.01) |
| *B60R 21/261* | (2011.01) |
| *B60N 2/427* | (2006.01) |
| *B60R 21/217* | (2011.01) |
| *B60R 21/2338* | (2011.01) |
| *B60R 21/239* | (2006.01) |
| *B60R 21/235* | (2006.01) |

(52) U.S. Cl.
CPC .......... *B60R 21/217* (2013.01); *B60R 21/233* (2013.01); *B60R 21/239* (2013.01); *B60R 21/2338* (2013.01); *B60R 21/2346* (2013.01); *B60R 21/261* (2013.01); *B60R 2021/23146* (2013.01); *B60R 2021/23382* (2013.01); *B60R 2021/23538* (2013.01); *B60R 2021/23557* (2013.01); *B60R 2021/2612* (2013.01)

(58) Field of Classification Search
CPC ........ B60R 21/239; B60R 2021/23324; B60R 21/231; B60R 21/264; B60R 21/261; B60R 2021/23146; B60R 2021/2612; B60R 2021/2642; B60N 2/42745; B60N 2002/5808

See application file for complete search history.

(56) References Cited

U.S. PATENT DOCUMENTS

| | | | |
|---|---|---|---|
| 2015/0367804 A1* | 12/2015 | Fujiwara .......... | B60R 21/23138 280/730.2 |
| 2016/0200280 A1* | 7/2016 | Fujiwara ............. | B60N 2/4279 280/729 |
| 2017/0174174 A1* | 6/2017 | Ohno .................... | B60R 21/235 |
| 2018/0050651 A1* | 2/2018 | Fukawatase .......... | B60R 21/237 |
| 2019/0084516 A1* | 3/2019 | Fukawatase ........ | B60R 21/2338 |

FOREIGN PATENT DOCUMENTS

| | | |
|---|---|---|
| JP | 2016-7901 A | 1/2016 |
| JP | 2017-109623 A | 6/2017 |
| WO | 2015/045613 A1 | 4/2015 |

OTHER PUBLICATIONS

English translation of International Search Report of the International Searching Authority for PCT/JP2019/000002 dated Mar. 12, 2019.

* cited by examiner

PASSENGER PROTECTION APPARATUS

TECHNICAL FIELD

The present invention relates to a passenger protection apparatus including a side airbag apparatus which protects passengers when an airbag is expanded and deployed on the seat side of a vehicle.

BACKGROUND

In order to protect passengers in the event of a vehicle accident, it is well known that vehicles are equipped with one or more airbags. These airbags include, for example, various forms such as: a so-called driver airbag which is expanded from the vicinity of the steering wheel of an automobile so as to protect the driver; a curtain airbag which is deployed downward on the inner side of the window of an automobile so as to protect passengers during collisions in the transverse direction of a vehicle, as well as when overturning and during rollover accidents; and a side airbag which is deployed on the side (seat side) of passengers so as to protect the passenger upon impact in the transverse direction of a vehicle. The present invention relates to a side airbag apparatus provided in a vehicle seat side part.

The side airbag apparatus described in Patent Document 1 below includes a main airbag along with an auxiliary airbag, wherein, preceding the main airbag, the auxiliary airbag is expanded and deployed to restrain passengers at an early stage. With such a side airbag apparatus, there is great restraint in the installation region, with a strong demand for size reduction of the apparatus. Moreover, in the side airbag apparatus, there is a demand for appropriate passenger protection performance through improved deployment speed and stabilization of the deployed shape and deploying behavior.

RELATED ART DOCUMENTS

Patent Documents

Patent Document 1: Japanese Unexamined Patent Publication No. 2009-023494

SUMMARY OF THE INVENTION

Problem to be Solved by the Invention

The present invention has been created in view of the abovementioned problem, and an object thereof is to provide a passenger protection apparatus which includes a side airbag apparatus capable of quickly and properly restraining a passenger. Moreover, another object is to provide a passenger protection apparatus including a side airbag apparatus which contributes to the compactification of the apparatus.

MEANS FOR SOLVING THE PROBLEM

The present invention is applied to a passenger protection apparatus, including: a vehicle seat having a seat cushion forming a seating face along with a seat back forming a backrest; and a side airbag apparatus housed in this seat. The seat back includes a side support part which swells towards the front of the vehicle on the vehicle width direction side, with a side frame part having a frame side wall part (which extends in the vehicle traveling direction when the horizontal cross section is seen from above) arranged inside the side support part. The side airbag apparatus includes: an airbag which restrains a passenger when expanded and deployed; and an inflator supplying expansion gas to the airbag. The airbag includes: a first chamber (C1) which houses the inflator and is deployed outside in the vehicle width direction of the frame side wall part; a second chamber (C2) which is deployed inside in the vehicle width direction of the frame side wall part; and a gas guide (100) arranged so as to surround the inflator inside the first chamber. In addition, the first chamber (C1) is deployed such that at least a portion thereof, as seen from the vehicle side, overlaps the frame side wall part. A first inner vent is formed at the boundary part between the gas guide and the first chamber, with gas introduced from the gas guide to the first chamber via this first inner vent. Moreover, a second inner vent is formed at the boundary part between the gas guide and the second chamber, with gas introduced from the gas guide to the second chamber via this second inner vent.

Note that if the gas guide, the first chamber, and the second chamber are molded by separate panels (cloths), the second inner vent is formed so as to penetrate through these three panels.

Here, the inside in the vehicle width direction of the frame side wall part denotes the center side (passenger side) of the seat, while the outside in the vehicle width direction of the frame side wall part denotes the outside (door side, center console side) in the transverse direction of the seat.

According to the present invention having the configuration as described above, in the initial stage of deploying the airbag, expansion gas supplied from the inflator is introduced by the gas guide, in addition to flowing in the second chamber inside the frame side wall part as well as in the first chamber outside the frame side wall part, with these first and second chambers substantially simultaneously deployed. Here, because the first chamber is deployed so as to overlap the frame side wall part, as seen from the vehicle side, the first chamber is assuredly deployed such that the frame side wall part receives the reaction force of the first chamber. In contrast, on the side of (outside) the frame side wall part of the second chamber, reaction force is received by the first chamber or the frame side wall part.

A configuration can be employed in which a third inner vent is formed at the boundary part between the first chamber and the second chamber, with gas introduced from the second chamber to the first chamber via this third inner vent. If the gas is introduced to the first chamber not only from the gas guide but also from the second chamber, and the capacity (volume) of the first chamber is large, this first chamber is quickly deployed.

The first chamber can include: a rear region housing the gas guide: and a front region coupled to the front of this rear region. At this time, a fourth inner vent for introducing the expansion gas from the rear region to the front region is provided at the boundary part between the front region and the rear region. In this manner, if the first chamber is sectioned into two space regions, the front and the rear, the width (length) in the anteroposterior direction of this first chamber can be increased so as to restrain the passenger in a wider area and range.

The second chamber can be configured to be deployed, as seen from the vehicle side, so as not to overlap the frame side wall part. In this case, because the deployed position of the second chamber is shifted forward compared with the case of overlapping the frame side wall part, the shape of the overall airbag is advantageously more likely to be widened forward.

An external vent hole for discharging the expansion gas outside is preferably provided at the frontmost part of the first chamber.

The present invention can further include an internal expanding part (300) which is provided in the second chamber and is expandable by gas flowing in from the gas guide. Employing such a configuration initiates the expansion of the internal expanding part prior to the deployment of the second chamber. Therefore, in the so-called OOP (out of position) case in which a child is seated closely against the side support part or stands up, even if the internal expanding part expands in the initial stage of deploying the airbag, the second chamber is pressed against by the passenger (child), inhibiting the second chamber from expanding. As a result, in the so-called OOP (out of position) case, the impact acting on the passenger due to the second chamber can be moderated. That is, a pre-push chamber (second chamber) can avoid the passenger in the OOP case from being pushed away towards the center side of the vehicle, in addition to minimizing damage to this passenger due to the second chamber.

The internal expanding part (300) can be provided so as to cover the second inner vent. Moreover, the internal expanding part (300) can be formed from a cloth member and sewn on the periphery of the second inner vent.

The internal expanding part (300) can be an inner bag molded in a bag shape, and a fifth inner vent for discharging the gas into the second chamber can be formed in this inner bag. Alternatively, the internal expanding part (300) can be a cylindrically molded inner tube or loop diffuser, with the upper and lower ends of this inner tube or loop diffuser capable of opening inside the second chamber.

Moreover, the present invention further includes a strap with the front end thereof coupled to the rear side of the second chamber and with the rear end of the strap capable of being coupled to the side frame or a stud bolt for attaching the inflator to the side frame. Alternatively, while a non-expanding region can be configured so as to be formed in the rear of the expanding region of the second chamber, this non-expanding region can be coupled to the side frame or the stud bolt for attaching the inflator to the side frame. In this case, the deploying behavior, deployed shape, and deployed position in the anteroposterior direction of the second chamber can be controlled.

(Embodiments of the Present Invention)

The side airbag according to the present invention includes a type which is deployed on the door side of (outside) the seat, along with a type which is deployed on the vehicle center side of the seat. Note that a side airbag of a type which is deployed on the vehicle center side of the seat is generally referred to as a "far side airbag," "front center airbag," "rear center airbag," etc.

DESCRIPTION OF THE PREFERRED EMBODIMENT

The vehicle seat with the side airbag apparatus according to the embodiments of the present invention mounted thereon will be described with reference to the accompanying drawings. Note that "front" displayed in each figure denotes the front (traveling direction) of a vehicle, "rear" denotes the rear (on the side opposite the traveling direction) of the vehicle, "inside" denotes the inside in the vehicle width direction (on the passenger side), and "outside" denotes the outside in the vehicle width direction (on the door panel side).

Figure 1:
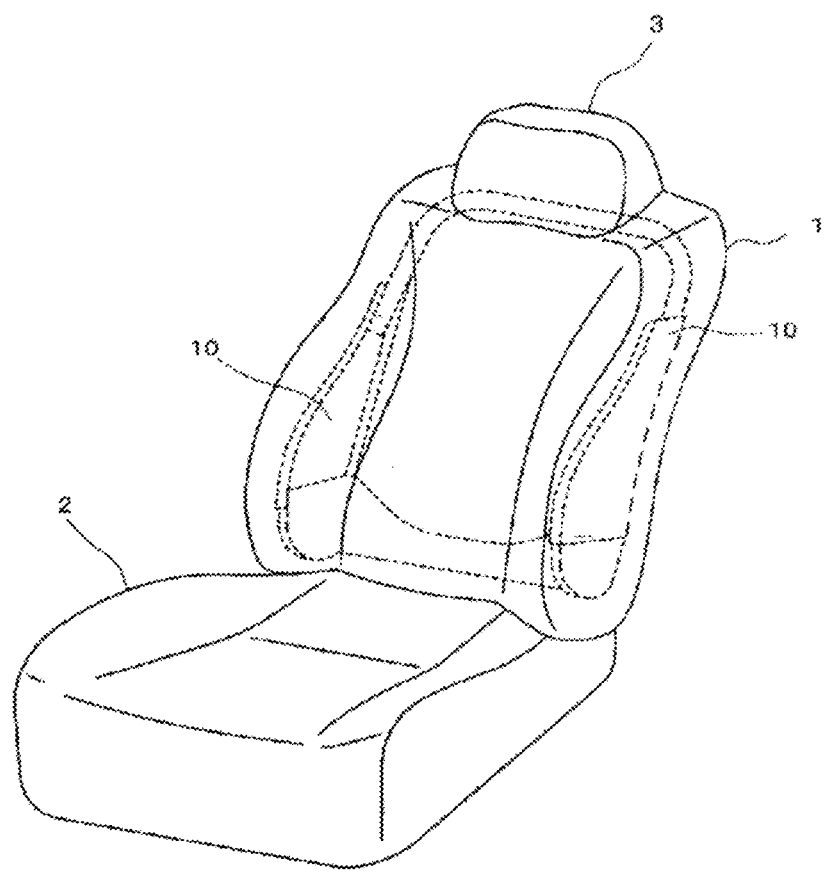
FIG. 1 is a perspective view mainly illustrating the external shape of a vehicle seat used for a passenger protection apparatus according to the present invention, with an illustration of the airbag unit omitted.
Figure 2:
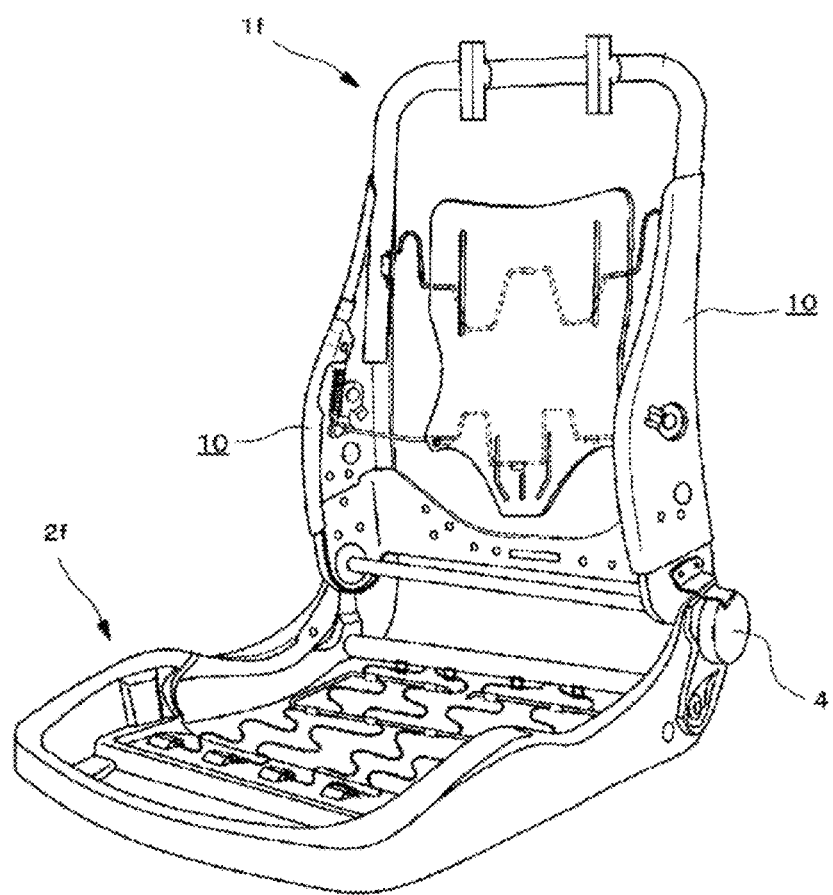
FIG. 2 is a perspective view illustrating an internal structure (seat frame) functioning as the framework of the vehicle seat illustrated in FIG. 1, with an illustration of the airbag unit omitted.
Figure 3:
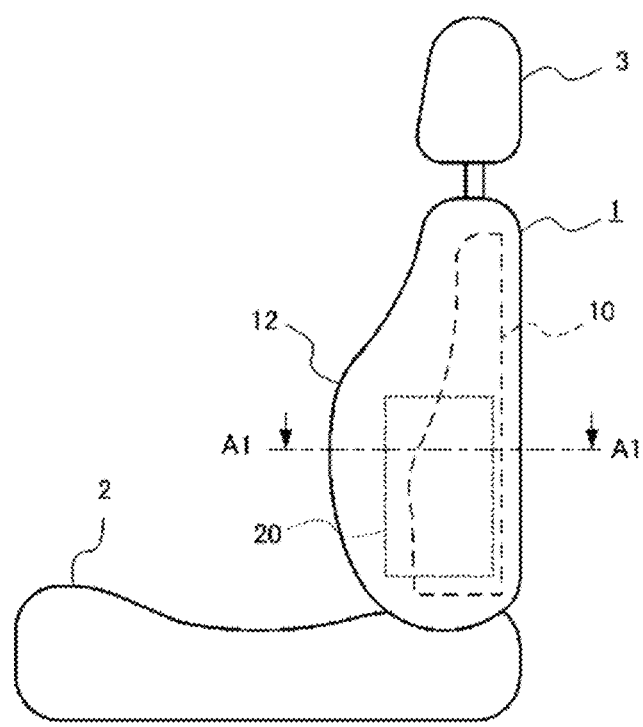
FIG. 3 is a schematic side view of the passenger protection apparatus according to the present invention and illustrates the state in which the airbag unit housed therein is observed from the outside in the vehicle width direction.
Figure 3:
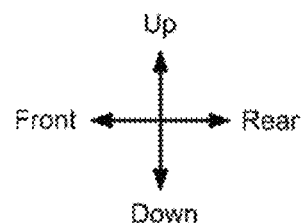

FIG. 1 is a perspective view mainly illustrating the external shape of a vehicle seat used for a passenger protection apparatus according to the present invention, with an illustration of the airbag apparatus (20) omitted. FIG. 2 is a perspective view illustrating the internal structure (seat frame) functioning as the framework of the vehicle seat illustrated in FIG. 1, with an illustration of the airbag apparatus (20) also omitted here. FIG. 3 is a schematic side view of the passenger protection apparatus according to Example 1, in addition to illustrating the state in which the airbag apparatus 20 housed therein on the side face (near side) near the door of the vehicle seat is observed from the outside in the vehicle width direction.

The present invention is a passenger protection apparatus including: a vehicle seat; and a side airbag apparatus (20) housed in this seat. As illustrated in FIGS. 1 and 2, seen as the location, the vehicle seat according to the present example is configured by: a seat cushion 2 of the part on which a passenger is seated; a seat back 1 forming a backrest; and a headrest 3 coupled to the upper end of the seat back 1.

A seat back frame 1f forming the skeleton of the seat is provided inside the seat back 1, with a pad made of a urethane foaming material, etc. arranged and formed on the surface and periphery thereof. In addition, the surface of the pad is covered with a skin 14 such as leather or fabric. A seating frame 2f is arranged on the bottom side of the seat cushion 2, with a pad made of a urethane foaming material, etc. provided on the upper surface and periphery thereof, wherein, the surface of this pad is covered with a skin 14 (see FIG. 4) such as leather or fabric. Note that the seating frame 2f and the seat back frame 1f are coupled via a reclining mechanism 4.

As illustrated in FIG. 2, the seat back frame 1f is configured in a frame shape by: a side frame 10 arranged so as to be separated into the left and right and extending in the vertical direction; an upper frame coupled to the upper end of this side frame 10; and a lower frame coupled to the lower end thereof. A cushion member is provided outside a headrest frame to configure the headrest 3.

Figure 4:
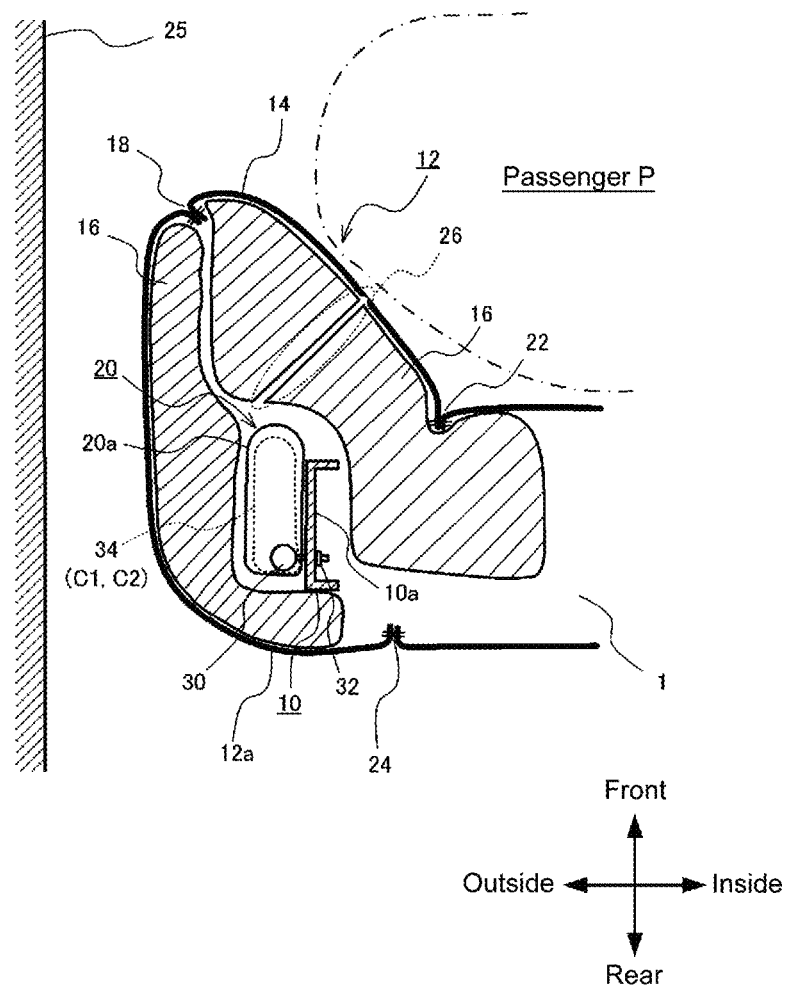
FIG. 4 is a cross sectional view illustrating the structure of the main parts of the passenger protection apparatus according to the present invention, corresponding to part of the cross section in the A1-A1 direction of FIG. 3.
Figure 5:
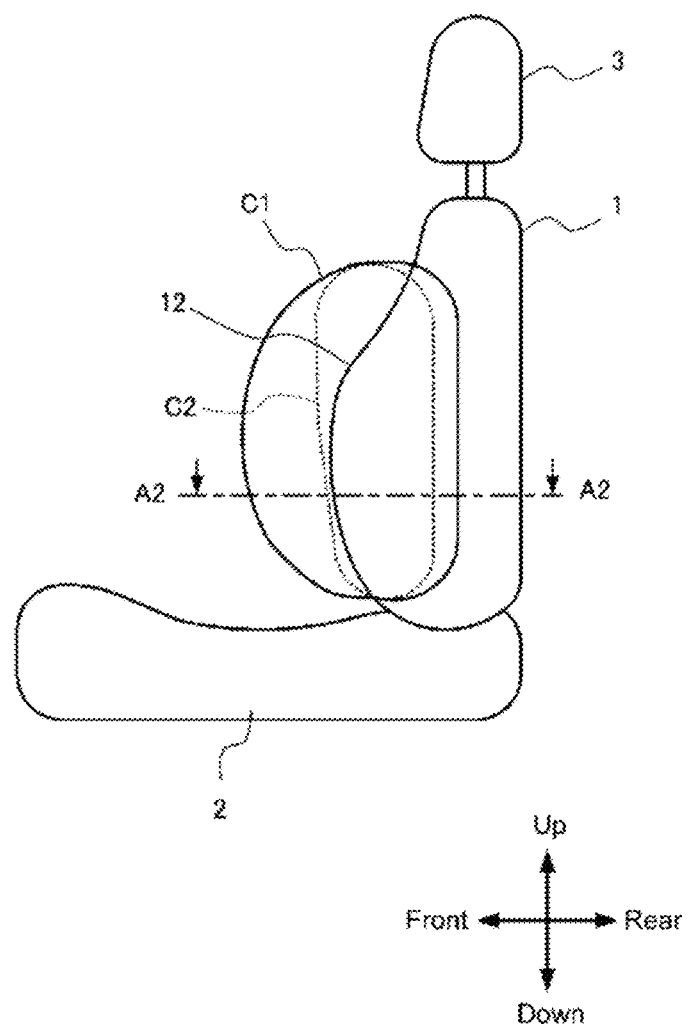
FIG. 5 is a schematic side view of the passenger protection apparatus according to the present invention and illustrates the state in which the airbag deployed therein is observed from the outside in the vehicle width direction.

FIG. 4 is a cross sectional view illustrating the structure of the passenger protection apparatus according to the present invention, corresponding to part of the cross section in the A1-A1 direction of FIG. 3. FIG. 5 is a schematic side view of the passenger protection apparatus according to the present invention and illustrates the state in which the airbag deployed therein is observed from the outside in the vehicle width direction.

The side frame 10 can be molded of resin or metal and, as illustrated in FIG. 4, can be formed into an L shaped cross sectional shape or a U shaped cross sectional shape. The side frame 10 includes a frame side wall part 10a extending in the vehicle traveling direction when the horizontal cross section is seen from above. In addition, an airbag module (side airbag apparatus) 20 is fixed to the outside in the vehicle width direction of this frame side wall part 10a.

As illustrated in FIG. 4, the seat back 1 includes a side support part 12 which swells in the vehicle traveling direction (vehicle front) on the vehicle width direction side (end). Inside the side support part 12, the side airbag apparatus 20 is housed in a gap without a urethane pad 16 arranged therein. The side airbag apparatus 20 includes: an airbag 34 for restraining a passenger when expanded and deployed; and an inflator 30 for supplying expansion gas to the airbag 34.

Seams 18, 22, and 24 of the skin 14 of the seat back 1 are interwoven and sewn. Note that the front seam 18 is cleft when the airbag is deployed. Moreover, a start region 26 as a starting point (when the side support part 12 bends towards the passenger side due to the expansion of a second chamber C2) is formed in the side support part 12. The start region 26 can be any one of a notch, recess, or thin region, or combinations thereof. The start region 26 only needs to be formed at a urethane 16 part inside the side support part 12. Moreover, the start region 26 can be omitted by adjusting the thickness of the urethane 16, the strength of the skin, etc.

The airbag 34 is covered with a flexible cover 20a made of fabric. The airbag 34, for example, can appropriately employ folding or rolling in bellows, in addition to compressing via an appropriate method. In FIG. 4, the symbol 25 denotes a door trim. As will be described later in detail, in the storage state in which the airbag 34 is folded, in order to maintain the positional relationship when the airbag is expanded and deployed, the first chamber C1 side on which the inflator 30 is housed is disposed outside in the vehicle width direction of the frame side wall part 10a, while the second chamber C2 coupled to this first chamber C1 is disposed inside in the vehicle width direction of the frame side wall part 10a.

The second chamber C2 is deformed such that at least the front side part 14 of the side support part 12 protrudes towards the passenger so as to contact and press the side support part 12 with the waist and shoulder parts of the passenger. By pushing the waist part close to the center of gravity of the human body, the restraint performance of a passenger in the initial stage when an accident occurs can be improved. The second chamber C2 is preferably deployed substantially concurrently with the first chamber C1 or prior thereto.

Note that the capacity of the second chamber C2 (capacity upon deployment) is set to be smaller than the capacity of the first chamber C1 (capacity upon deployment). The shape and capacity of the second chamber C2 may be adjusted such that the second chamber C2 may only be deployed inside the side support part 12 without getting outside therefrom. In other words, the deployed second chamber C2 does not have to protrude to the vehicle front compared with the front end of the cleft side support part 12. Moreover, the deploying behavior of the first chamber C1 and the second chamber C2 can be adjusted by a method of folding the airbag 34, the configuration of the folded airbag 34, the setting of the gas jet direction of the inflator 30, the direction of the gas flow between the first chamber C1 and the second chamber C2, etc.

REFERENCE NUMERALS

While basic concepts and examples according to the present invention will hereinafter be described, reference symbols are provided based on a predetermined rule in the accompanying drawings for convenience and will be initially described regarding this point. Moreover, if the chamber configuring the airbag is divided into the front and rear, the front chamber part is labeled "F," while the rear chamber part is labeled "R." Moreover, regarding the position of the end of chambers in the anteroposterior direction along the vehicle traveling direction, the front end thereof is labeled "f," while the rear end thereof is labeled "r." In addition, after f, r, the number (2) corresponding to the number (C2, etc.) of the chamber is assigned.

Note that in each example, while identical components are labeled with identical symbols, components that are not identical but are similar may be labeled with identical symbols.

(Basic Concepts of the Present Invention)

Figure 6:
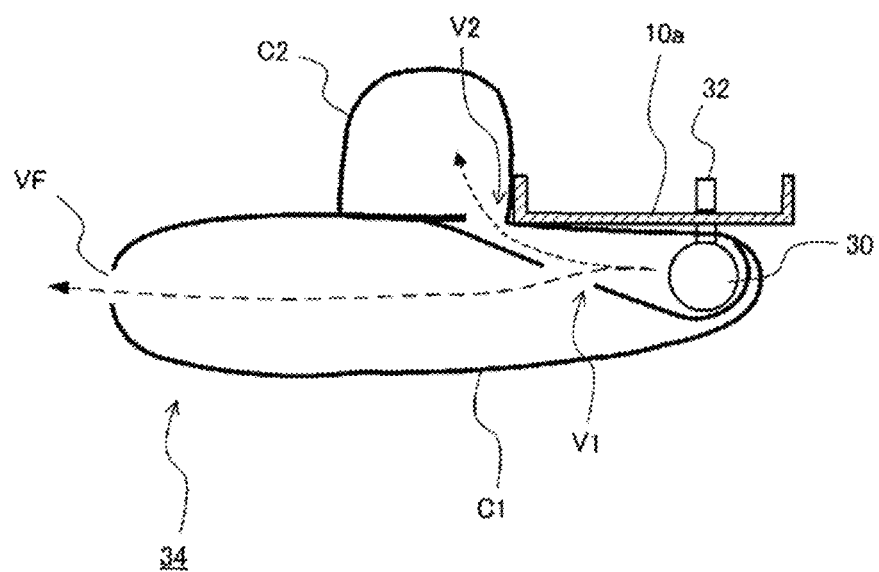
FIG. 6 is a schematic view used to express the basic concepts of the present invention, illustrating the deployed state of an airbag apparatus, corresponding to the cross section in the A2-A2 direction of FIG. 5.

FIG. 6 is a schematic view describing basic concepts of the present invention, illustrating the deployed state of an airbag apparatus (20), corresponding to the cross section in the A2-A2 direction of FIG. 5. The side airbag 34 according to the present invention includes: a first chamber C1 which houses the inflator 30 and is deployed outside in the vehicle width direction of the frame side wall part 10a; a second chamber C2 which is deployed inside in the vehicle width direction of the frame side wall part 10a; and a gas guide 100 arranged so as to surround the inflator inside the first chamber C1. In addition, the first chamber C1 is deployed such that at least a portion thereof, as seen from the vehicle side, overlaps the frame side wall part 10a. A first inner vent V1 is formed at the boundary part between the gas guide 100 and the first chamber C1, with gas introduced from the gas guide 100 to the first chamber C1 via this first inner vent V1. Moreover, a second inner vent V2 is formed at the boundary part between the gas guide 100 and the second chamber C2, with gas introduced from the gas guide 100 to the second chamber C2 via this second inner vent V2.

As the inflator 30, for example, a cylindrical cylinder type inflator can be used. A pair of upper and lower stud bolts 32 protrude from the outer peripheral part of the inflator 30 towards the inside in the vehicle width direction. These stud bolts 32 are attached (fastened and fixed) to the side frame 10 by nuts. Multiple gas jet ports arranged in the peripheral direction are formed in the inflator 30, from which the gas is radially ejected.

An airbag control ECU (not illustrated) mounted on the vehicle is electrically connected to this inflator 30. A satellite sensor for detecting side collisions is electrically connected to this airbag control ECU. The inflator 30 can be configured to operate when the airbag control ECU detects a side collision based on a signal from this satellite sensor.

Example 1

Figure 7:
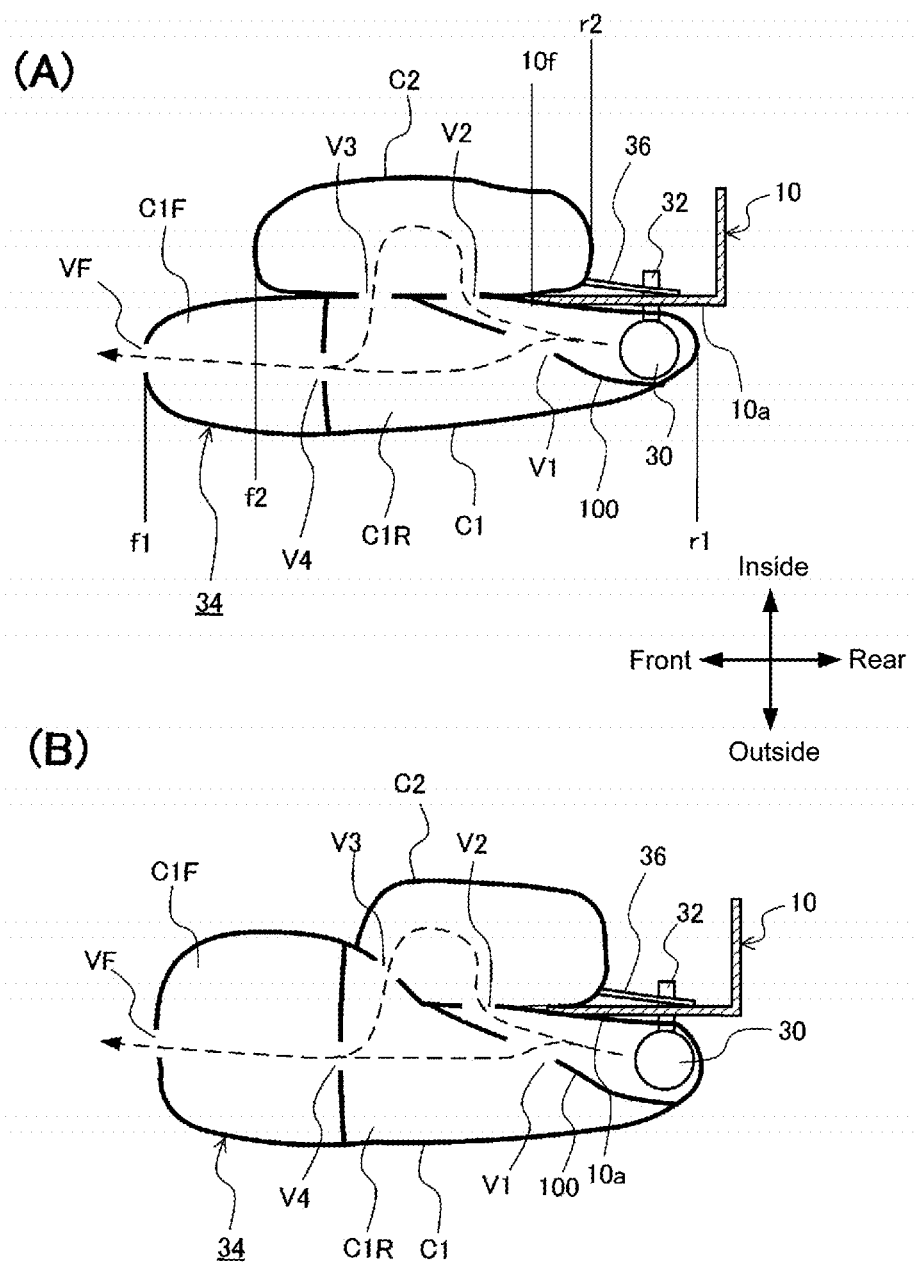
FIG. 7 is a schematic view illustrating the deployed state of an airbag apparatus according to Example 1 of the present invention, corresponding to the cross section in the A2-A2 direction of FIG. 5.

FIG. 7 is a schematic view illustrating the deployed state of an airbag apparatus according to Example 1 of the present invention, corresponding to the cross section in the A2-A2 direction of FIG. 5. The examples illustrated in both figures (A) and (B) are configured based on the same concept, only slightly differing in terms of the configuration and structure of a first chamber C1.

In the present example, when the airbag is deployed, a rear end part r2 in the expanding region of the second chamber C2 is disposed in front of a rear end part r1 of the first chamber C1, as seen from the vehicle side. Moreover, the front end f2 of the second chamber C2 is disposed at the rear of the front end f1 of the first chamber C1. Moreover, the first chamber C1 is deployed such that the rear part thereof, as seen from the vehicle side, overlaps the frame side wall part 10a. In contrast, the second chamber C2 is deployed such that, as seen from the vehicle side, the front part overlaps the first chamber C1, while the rear part thereof overlaps the frame side wall part 10a.

A first inner vent V1 is formed at the boundary part between the gas guide 100 and the first chamber C1, with gas introduced from the gas guide 100 to the first chamber C1 via this first inner vent V1. Moreover, a second inner vent V2 is formed at the boundary part between the gas guide 100 and the second chamber C2, with gas introduced from the gas guide 100 to the second chamber C2 via this second inner vent V2.

The first chamber C1 is sectioned into two space regions C1F, C1R disposed at the front and rear in the vehicle traveling direction, with an inner vent V4 provided at this section part (boundary part). Moreover, a vent hole V3 is formed at the boundary part between the first chamber C1 and the second chamber C2. In addition, gas emitted from an inflator 30 is substantially concurrently introduced to the first and second inner vents V1, V2 via the gas guide 100 so as to flow into the first chamber C1 and the second chamber C2. The gas in the second chamber C2 flows into a rear region C1R of the first chamber C1 via a third inner vent V3. The gas which has flowed into the rear region C1R of the first chamber C1 reaches a front region C1F via a fourth inner vent V4. Subsequently, the gas is discharged from an external vent hole VF formed at the front end of the first chamber C1.

In the example illustrated in figure (A), the first chamber C1 (C1F, C1R) is disposed outside the side frame 10 so as to be deployed outside the second chamber C2. On the other hand, in the example illustrated in figure (B), the first chamber C1 (specifically, C1F) is deployed in front of the side frame 10, in addition to being partially routed to the front of the second chamber C2. The structure as in figure (B) advantageously allows the gas reaching from the second chamber C2 to the first chamber C1 to smoothly flow, in addition to restraining the passenger from moving obliquely to the front.

According to the present example having the abovementioned configuration, the first chamber C1 is deployed outside the side support part in the initial stage of operating the airbag apparatus. At this time, because the first chamber C1 is deployed so as to overlap the frame side wall part 10a, as seen from the vehicle side, the first chamber C1 is assuredly deployed such that the frame side wall part 10a receives the reaction force of the first chamber C1. In contrast, the second chamber C2 is expanded and deployed so as to quickly restrain a passenger P from moving to the outside in the vehicle width direction.

A strap (strip member) 36 is provided at the rear end of the second chamber C2. The strap 36 couples the rear end of the second chamber C2 and the stud bolts 32. Note that the rear end of the strap 36 can be coupled to the side frame 10. In such a configuration, the deploying behavior, deployed shape, and deployed position in the anteroposterior direction of the second chamber C2 can be controlled.

Note that in the present example, along with other examples described below, other coupling structures can be employed instead of the strap 36. For example, a non-expanding region can be configured so as to be formed in the rear of the expanding region of the second chamber C2, and this non-expanding region can be configured so as to be coupled to the side frame 10 or the stud bolts 32 for attaching the inflator 30 to the side frame 10.

Example 2

Figure 8:
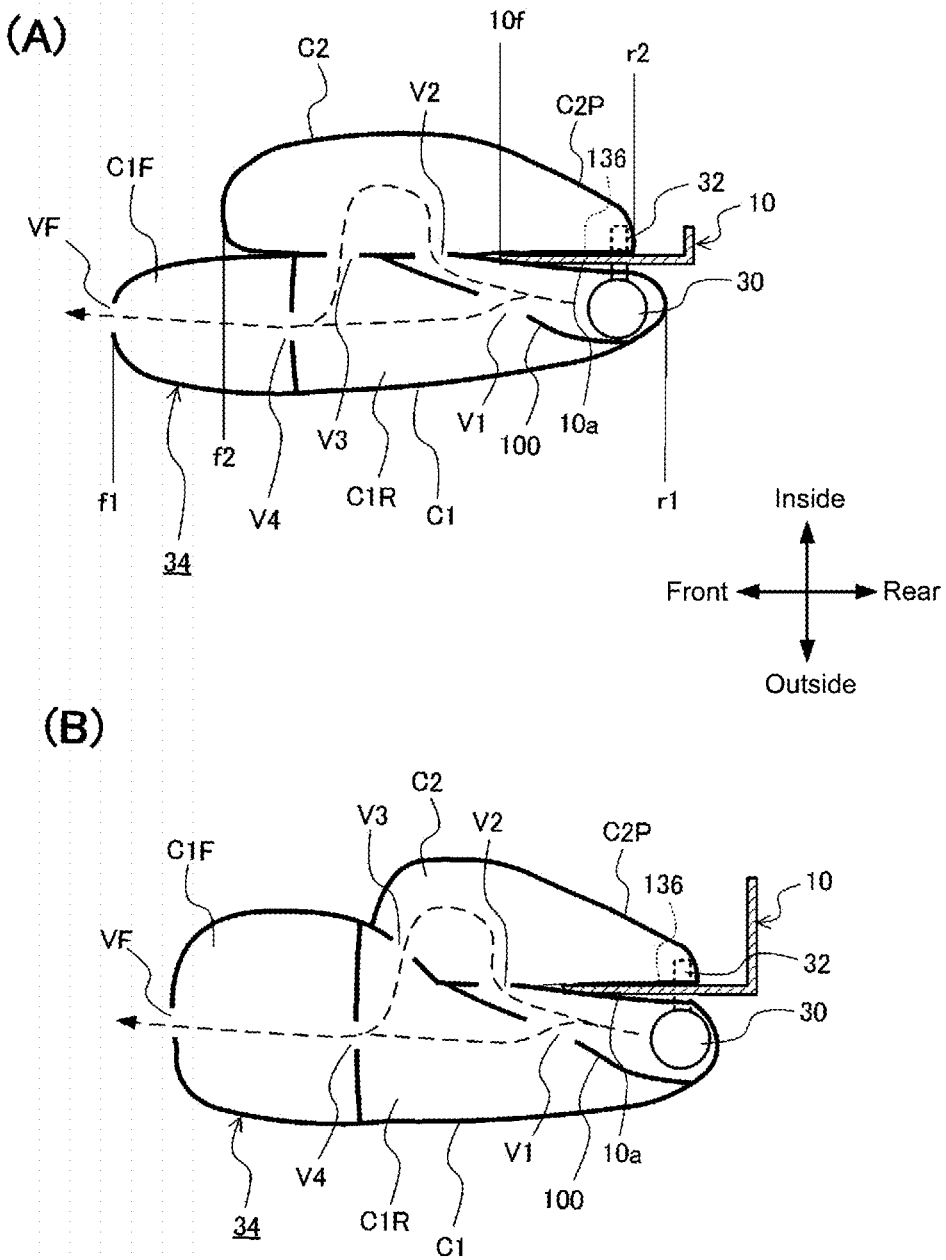
FIG. 8 is a schematic view illustrating the deployed state of an airbag apparatus according to Example 2 of the present invention, corresponding to the cross section in the A2-A2 direction of FIG. 5.
Figure 9:
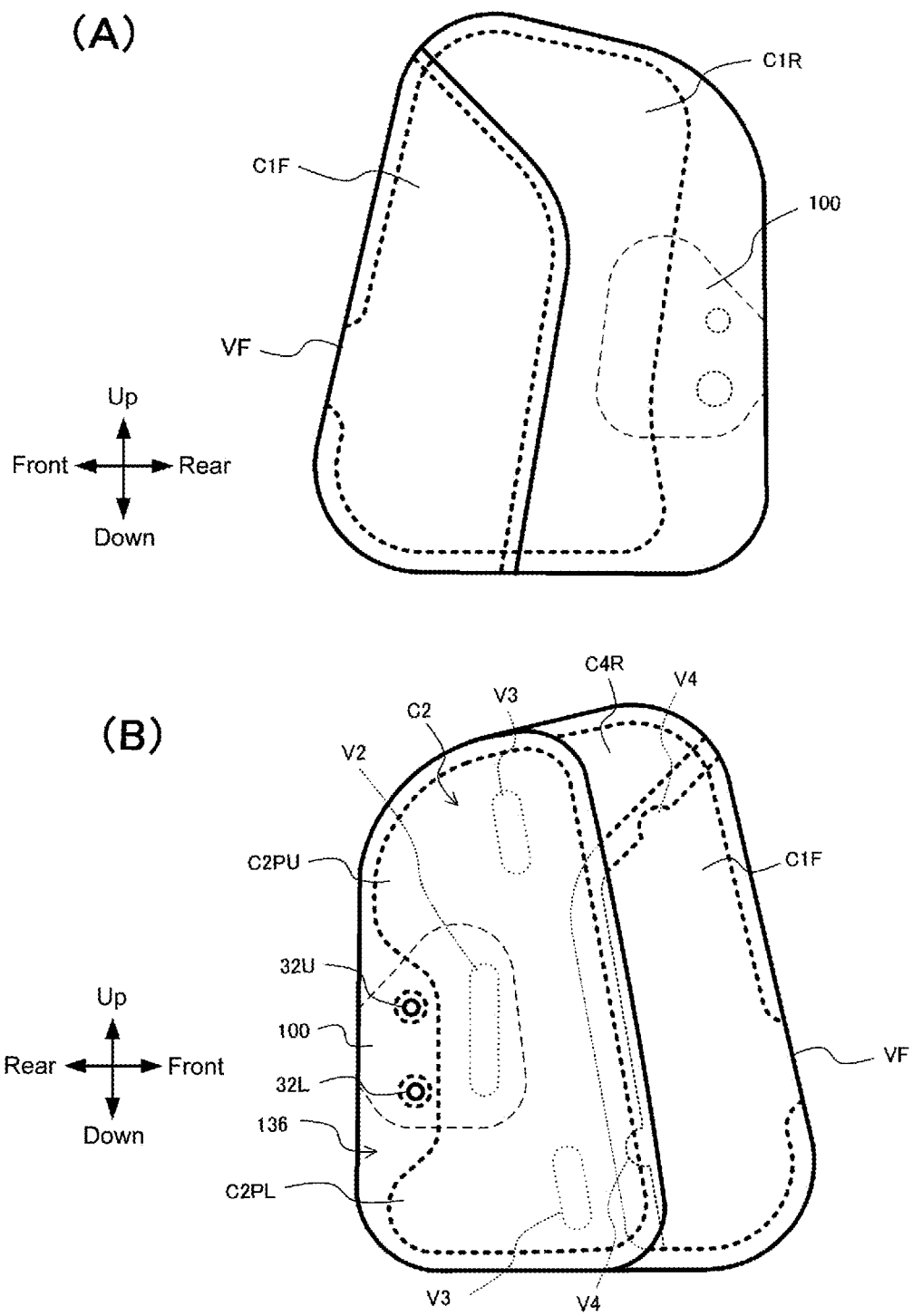
FIG. 9 is a side view illustrating the deployed state of the airbag apparatus illustrated in FIG. 8, in addition to illustrating the configuration and shape of panels constituting the airbag.

FIGS. 8(A), (B) are schematic views illustrating the deployed state of an airbag apparatus according to Example 2 of the present invention, corresponding to the cross section in the A2-A2 direction of FIG. 5. The examples illustrated in both figures (A) and (B) are configured based on the same concept, only differing in terms of the shape and structure of a first chamber C4. FIG. 9 is a side view illustrating the deployed state of the airbag apparatus illustrated in FIG. 8, in addition to illustrating the configuration and shape of panels constituting the airbag.

The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, as seen from the vehicle side, the rear end part r2 in the expanding region of the second chamber C2 is disposed slightly in front of the rear end part r1 of the first chamber C1, but extends substantially rearward towards the position of the stud bolts 32.

The present example is a modified example of the abovementioned Example 1, with most configurations identical. The difference is that a protruding expanding part C2P is formed in the rear of the second chamber C2. Note that, needless to say, the protruding expanding part C2P of the second chamber C2 employed in the present example can also be applied to the abovementioned Example 1.

As illustrated in FIG. 9(B), the protruding expanding part C2P is divided into a part C2PU disposed above two holes 32U, 32L for the stud bolts 32, along with a part C2PL disposed therebelow. In addition, in order to avoid the position of each hole 32U, 32L for the stud bolt 32, that is, the attachment position of the inflator 30, protruding expanding parts C2PU, C2PL are formed. A non-expanding region 136 is disposed between these two protruding expanding parts C2PU, C2PL, with this non-expanding region 136 fastened and fixed to the stud bolts 32.

Note that the non-expanding region 136 functions in the same way as the strap 36 in the abovementioned other examples. That is, by coupling and fixing the non-expanding region 136 to the stud bolts 32, the deploying behavior, deployed shape, and deployed position in the anteroposterior direction of the second chamber C2 can be controlled.

In the example illustrated in FIG. 8(A), the first chamber C1 (C1F, C1R) is disposed outside the side frame 10 so as to be deployed outside the second chamber C2. On the other hand, in the example illustrated in FIG. 8(B), the first chamber C1 (specifically, C1F) is deployed in front of the side frame 10, in addition to being partially routed to the front of the second chamber C2. The structure as in figure (B) advantageously allows the gas reaching the first chamber C1 from the second chamber C2 to smoothly flow, in addition to restraining the passenger from moving obliquely to the front.

Example 3

Figure 10:
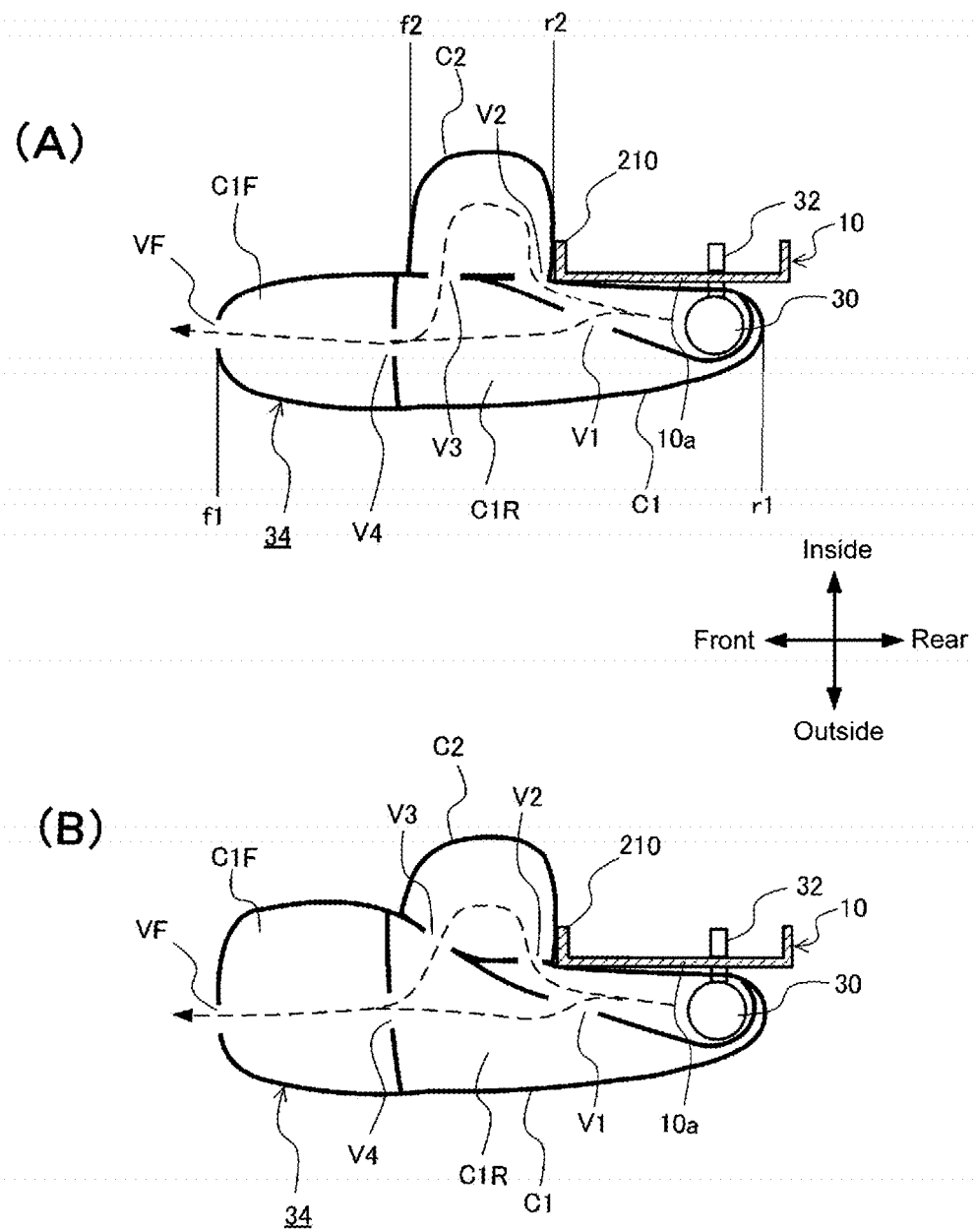
FIG. 10 is a schematic view illustrating the deployed state of an airbag apparatus according to Example 3 of the present invention, corresponding to the cross section in the A2-A2 direction of FIG. 5.

FIG. 10 is a schematic view illustrating the deployed state of an airbag apparatus according to Example 3 of the present invention, corresponding to the cross section in the A2-A2 direction of FIG. 5. The examples illustrated in both figures (A) and (B) are configured based on the same concept, only differing in terms of the configuration and structure of a fourth chamber C4. Note that because the present example has a large number of parts common to Example 2 illustrated in FIG. 9, descriptions will be provided focusing on the differences from Example 2 in order to facilitate understanding.

Unlike Example 2, in the present example, when the airbag in the deployed state is observed from the vehicle width direction, the second chamber C2 is configured so as not to overlap the frame side wall part 10a of the side frame 10. A front wall part 210 which protrudes towards the inside (inside in the vehicle width direction) of the vehicle is formed at the front end of the frame side wall part 10a and supported such that the rear end part of the second chamber C2 abuts this front wall part 210.

In the example illustrated in FIG. 10(A), the first chamber C1 (C1F, C1R) is disposed outside the side frame 10 so as to be deployed outside the second chamber C2. On the other hand, in the example illustrated in FIG. 10(B), the first chamber C1 (specifically, C1F) is deployed in front of the side frame 10, in addition to being partially disposed in front of the second chamber C2. The structure as in figure (B) advantageously allows the gas reaching from the second chamber C2 to the first chamber C1 to smoothly flow, in addition to restraining the passenger from moving obliquely to the front.

Example 4

FIGS. 11(A), (B) are schematic views illustrating the deployed state of an airbag apparatus according to Example 4 of the present invention, corresponding to the cross section in the A2-A2 direction of FIG. 5. The examples illustrated in both figures (A) and (B) are configured based on the same concept, only slightly differing in terms of the configuration and structure of the first chamber C1. Note that the present example is obtained by adding the below-mentioned inner tube 300 to Example 1 (FIG. 7).

The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of a frame side wall part 10a; a second chamber C2 which is deployed inside in the vehicle width direction of the frame side wall part 10a; and an inner expanding part 300 which expands at least on the rear side of the vehicle in the second chamber C2 via the gas supplied from the gas guide 100. In addition, the first chamber C1 is deployed such that at least a portion thereof, as seen from the vehicle side, overlaps the frame side wall part 10a. Moreover, the second chamber C2 expands via the gas flowing out from the inner tube 300 as an internal expanding part.

Figure 11:
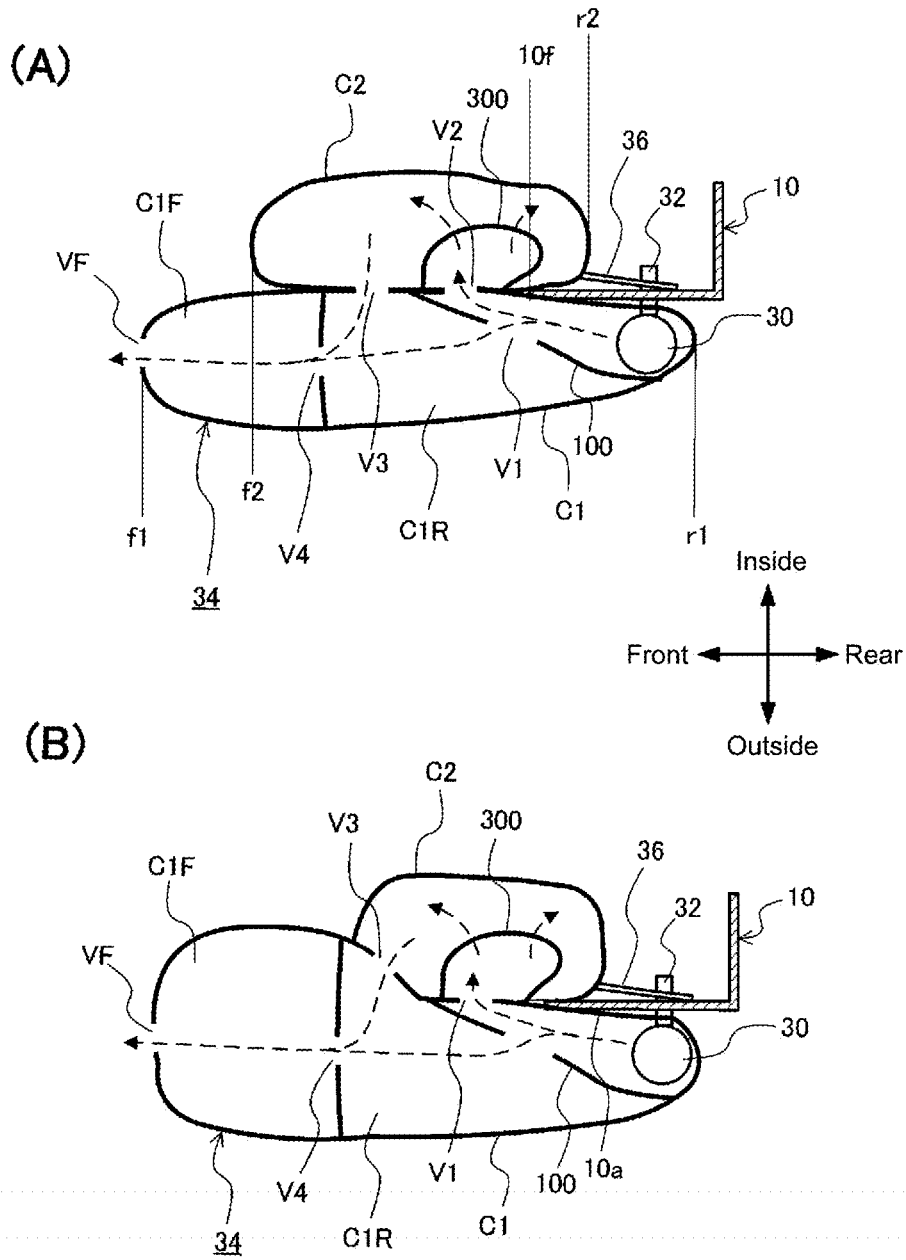
FIGS. 11(A), (B) are schematic views illustrating the deployed state of an airbag apparatus according to Example 4 of the present invention, corresponding to the cross section in the A2-A2 direction of FIG. 5.

The inner tube 300 is configured to be cylindrically molded so as to extend in the direction perpendicular to the paper face of FIG. 11 (vertical direction of the vehicle), with the upper and lower ends opening inside the second chamber C2. Such an inner tube 300 can be molded from the same cloth member as in other chambers and can be sewn on the periphery of the vent hole V2.

As indicated by the dashed line arrows, expansion gas emitted from the inflator 30 flows from the gas guide 100 to the inner tube 300 via the vent hole V2 and is subsequently filled into the second chamber C2 from upper and lower openings of the inner tube 300. In addition, the gas inside the second chamber C2 flows into a rear region C1R of the first chamber C1 via the vent hole V3 and is then discharged from an external vent hole VF (formed at the front end of a front region C1F of the first chamber C1) via the vent hole V4.

In the example illustrated in figure (A), the first chamber C1 (C1F, C1R) is disposed outside the side frame 10 so as to be deployed outside the second chamber C2. On the other hand, in the example illustrated in figure (B), the first chamber C1 (specifically, C1F) is deployed in front of the side frame 10, in addition to being partially routed to the front of the second chamber C2.

The characteristic operation (mode of operation) in the present example will hereinafter be described. First, for the case in which a passenger is seated normally in the seat, as illustrated in FIG. 11, after gas flows from the gas guide 100 to the inner tube 300 and the first chamber C1, gas flows from the second chamber C2 to the first chamber C1 so as to deploy each chamber. That is, all chambers are fully deployed. In the initial stage of deploying the airbag 34, the gas supplied via the inner tube 300 allows the second chamber C2 to be expanded and deployed so as to restrain the passenger towards the center side of the seat.

On the other hand, in the so-called OOP (out of position) case in which a child is seated pressed up against a side support part or stands up, even if the second chamber C2 is pressed against by the passenger (child) in the initial stage of deploying the airbag 34 so as to deploy the inner tube 300, the second chamber C2 tends not to expand, while the gas tends to flow into the third chamber C1. As a result, the impact acting on the passenger due to the expansion of the second chamber C2 can be moderated. That is, a pre-push chamber (second chamber C2) can prevent the passenger in the OOP case from being pushed away towards the center side of the vehicle, in addition to minimizing damage to this passenger due to the second chamber C2. At this time, because the first chamber C1 is quickly deployed, this first chamber C1 assuredly restrains and protects the passenger.

Example 5

Figure 12:
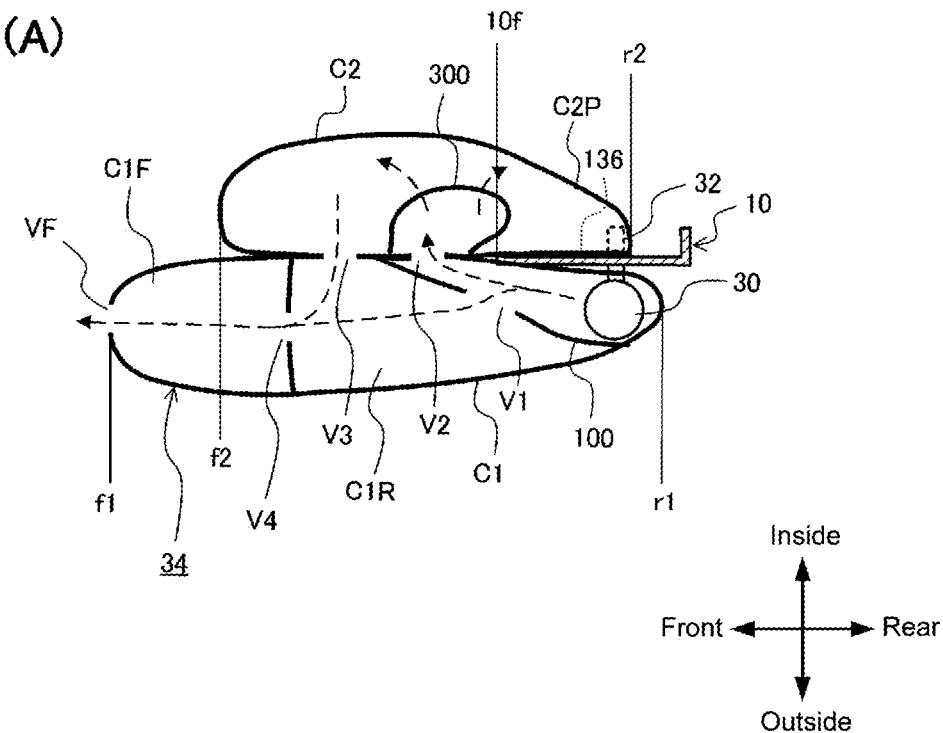
FIGS. 12(A), (B) are schematic views illustrating the deployed state of an airbag apparatus according to Example 5 of the present invention, corresponding to the cross section in the A2-A2 direction of FIG. 5.
Figure 12:
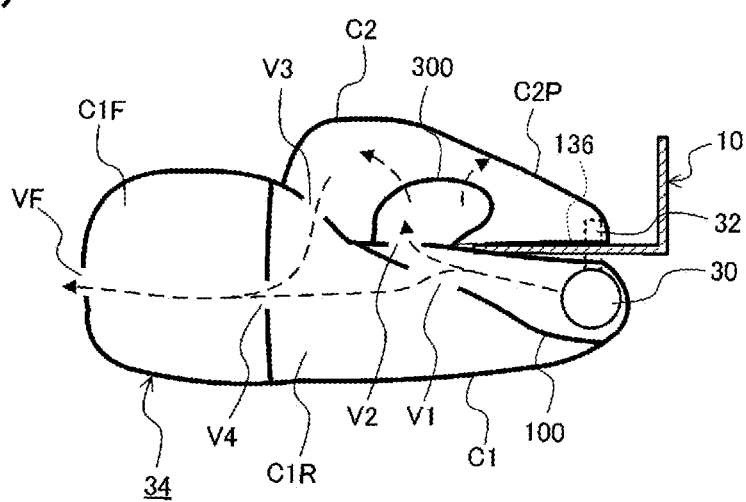

FIGS. 12(A), (B) are schematic views illustrating the deployed state of an airbag apparatus according to Example 5 of the present invention, corresponding to the cross section in the A2-A2 direction of FIG. 5. The examples illustrated in both figures (A) and (B) are configured based on the same concept, only slightly differing in terms of the configuration and structure of the first chamber C1. Note that the present example is obtained by adding inner tube 300 described below to Example 2 (FIG. 8).

The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, as seen from the vehicle side, the rear end part r2 in the expanding region of the second chamber C2 is disposed slightly in front of the rear end part r1 of the first chamber C1, but extends substantially rearward towards the position of the stud bolts 32.

The present example is a modified example of Example 4 above, with most configurations identical. The difference is that a protruding expanding part C2P is formed in the rear of the second chamber C2. Note that the protruding expanding part C2P of the second chamber C2 employed in the present example is the same as in Example 2 described above.

In the example illustrated in the drawing of FIG. 12(A), the first chamber C1 (C1F, C1R) is disposed outside the side frame 10 so as to be deployed outside the second chamber C2. On the other hand, in the example illustrated in the drawing of FIG. 12(B), the first chamber C1 (specifically, C1F) is deployed in front of the side frame 10, in addition to being partially routed to the front of the second chamber C2.

Example 6

Figure 13:
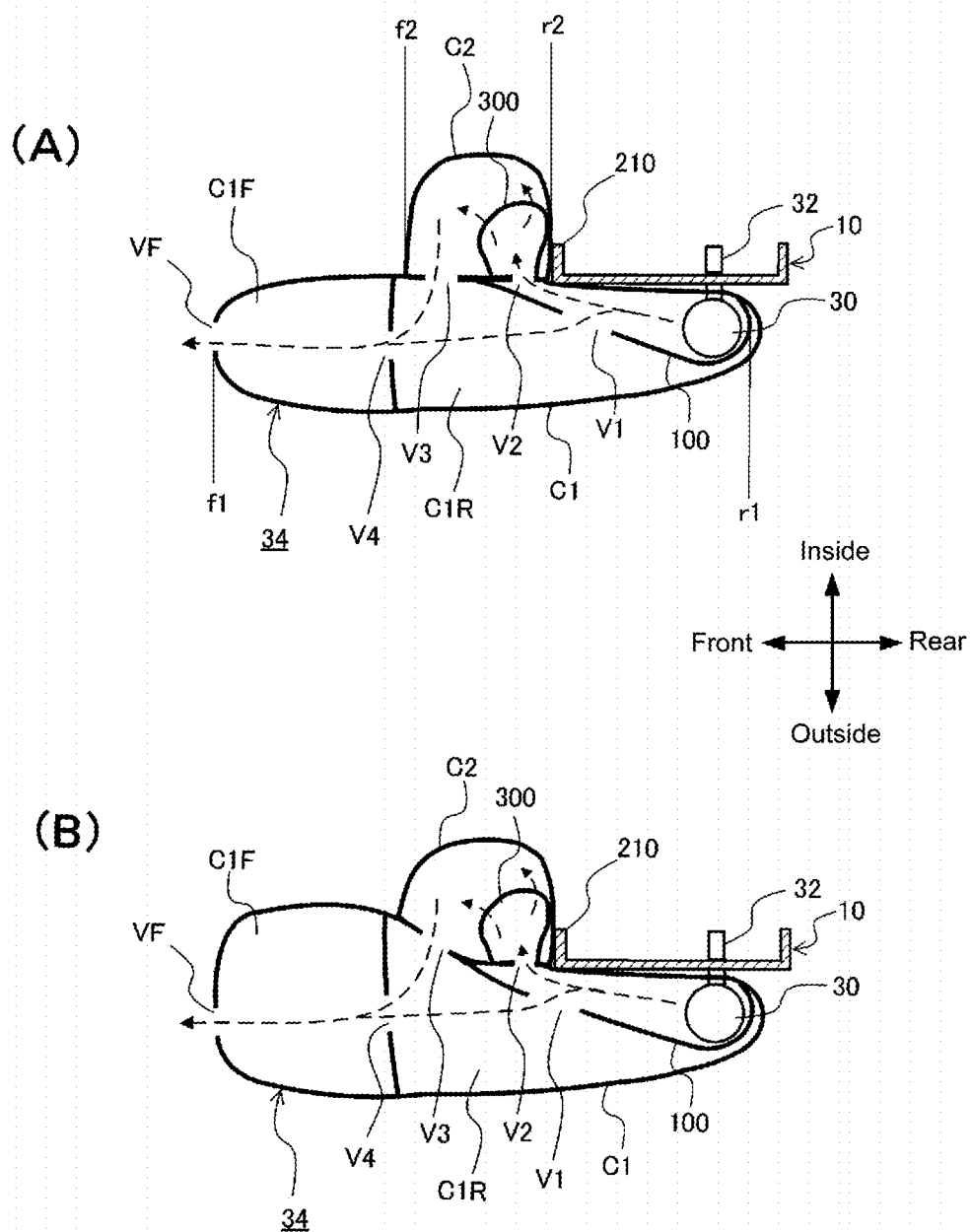
FIG. 13 is a schematic view illustrating the deployed state of an airbag apparatus according to Example 6 of the present invention, corresponding to the cross section in the A2-A2 direction of FIG. 5.

FIGS. 13(A), (B) are schematic views illustrating the deployed state of an airbag apparatus according to Example 6 of the present invention, corresponding to the cross section in the A2-A2 direction of FIG. 5. The examples illustrated in both figures (A) and (B) are configured based on the same concept, only slightly differing in terms of the configuration and structure of the first chamber C1. Note that the present example is obtained by adding inner tube 300 described below to Example 3 (FIG. 9).

In the example illustrated in FIG. 13(A), the first chamber C1 (C1F, C1R) is disposed outside the side frame 10 so as to be deployed outside the second chamber C2. On the other hand, in the example illustrated in FIG. 13(B), the first chamber C1 (specifically, C1F) is deployed in front of the side frame 10, in addition to being partially routed to the front of the second chamber C2.

(Interpretation of the Technical Scope of the Present Invention)

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative but not limiting. Without departing from the spirit and scope of the present invention, the described embodiments may take on various modifications. For example, while a side airbag on the near side has been predominantly mentioned in the Description of the Preferred Embodiment, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A side airbag apparatus for a vehicle seat including a side frame having a side wall part, the side airbag apparatus comprising:
    an airbag for restraining a passenger when expanded and deployed; and
    an inflator for supplying expansion gas to the airbag,
    the airbag including:
        a first chamber housing the inflator and deployable outwardly in a lateral direction relative to the side wall part, at least a portion of the first chamber overlapping the side wall part in the lateral direction;
        a second chamber deployable inwardly in the lateral direction relative to the side wall part; and
        a gas guide arranged so as to surround the inflator inside the first chamber, wherein the airbag includes:
    a first inner vent formed at a first boundary part between the gas guide and the first chamber, with gas introduced from the gas guide to the first chamber via the first inner vent, and
    a second inner vent formed at a second boundary part between the gas guide and the second chamber, with gas introduced from the gas guide to the second chamber via the second inner vent
    wherein the second chamber is deployed so as not to overlap the side wall part in the lateral direction.

2. The side airbag apparatus according to claim 1, wherein:
    the first chamber includes: a rear region housing the gas guide: and a front region coupled to a front of the rear region, and
    a fourth inner vent for introducing the expansion gas from the rear region to the front region is provided at a further boundary part between the front region and the rear region.

3. The side airbag apparatus according to claim 1, wherein an external vent hole for discharging the expansion gas outside is provided at a frontmost part of the first chamber.

4. A side airbag apparatus for a vehicle seat including a side frame having a side wall part, the side airbag apparatus comprising:
an airbag for restraining a passenger when expanded and deployed; and
an inflator for supplying expansion gas to the airbag,
the airbag including:
a first chamber housing the inflator and deployable outwardly in a lateral direction relative to the side wall part, at least a portion of the first chamber overlapping the side wall part in the lateral direction;
a second chamber deployable inwardly in the lateral direction relative to the side wall part; and
a gas guide arranged so as to surround the inflator inside the first chamber, wherein the airbag includes:
a first inner vent formed at a first boundary part between the gas guide and the first chamber, with gas introduced from the gas guide to the first chamber via the first inner vent, and
a second inner vent formed at a second boundary part between the gas guide and the second chamber, with gas introduced from the gas guide to the second chamber via the second inner vent, and
an internal expanding part provided in the second chamber and expandable by gas flowing in from the gas guide.

5. The side airbag apparatus according to claim 4, wherein the internal expanding part is provided so as to cover the second inner vent.

6. The side airbag apparatus according to claim 5, wherein the internal expanding part is formed from a cloth member and sewn on a periphery of the second inner vent.

7. The side airbag apparatus according to claim 4, wherein:
the internal expanding part is an inner bag molded in a bag shape, and
a fifth inner vent for discharging the gas into the second chamber is formed in this inner bag.

8. The side airbag apparatus according to claim 4, wherein:
the internal expanding part is one of a cylindrically molded inner tube and loop diffuser, and
upper and lower ends of the internal expanding part open inside the second chamber.

9. The side airbag apparatus according to claim 1, further comprising a strap having a front end coupled to a rear side of the second chamber,
wherein a rear end of the strap is coupled to one of the side frame and a stud bolt for attaching the inflator to the side frame.

10. The side airbag apparatus according to claim 1, wherein a non-expanding region is formed in a rear of the expanding region of the second chamber, and this non-expanding region is coupled to one of the side frame and a stud bolt for attaching the inflator to the side frame.

11. A side airbag apparatus for a vehicle seat including a side frame having a side wall part, the side airbag apparatus comprising:
an airbag for restraining a passenger when expanded and deployed; and
an inflator for supplying expansion gas to the airbag,
the airbag including:
a first chamber housing the inflator and deployable outwardly in a lateral direction relative to the side wall part, at least a portion of the first chamber overlapping the side wall part in the lateral direction;
a second chamber deployable inwardly in the lateral direction relative to the side wall part; and
a deployable gas guide surrounding the inflator,
wherein the airbag includes:
a first inner vent formed at a first boundary part between the deployable gas guide and the first chamber, the first boundary part being vertically oriented, the first inner vent arranged to introduce gas from the deployable gas guide in a horizontal direction into the first chamber, and
a second inner vent formed at a second boundary part between the deployable gas guide and the second chamber, the second inner vent arranged to introduce gas from the deployable gas guide in the horizontal direction into the second chamber,
wherein the second chamber is deployed so as not to overlap the side wall in part the lateral direction.

12. The side airbag apparatus of claim 11, wherein the deployable gas guide includes a flexible panel defining the first boundary part.

13. The side airbag apparatus according to claim 1, further comprising a third chamber formed at third boundary part between the first chamber and the second chamber, with gas introduced from the second chamber to the first chamber via a third inner vent.

* * * * *